April 5, 1960 C. G. GIBBONS 2,931,483
RACK PROOFING APPARATUS
Filed May 17, 1954 3 Sheets-Sheet 1

INVENTOR
Charles G. Gibbons

BY Fearman † Fearman
ATTORNEYS

April 5, 1960  C. G. GIBBONS  2,931,483
RACK PROOFING APPARATUS
Filed May 17, 1954  3 Sheets-Sheet 2

INVENTOR
Charles G. Gibbons

BY
ATTORNEYS.

April 5, 1960 C. G. GIBBONS 2,931,483
RACK PROOFING APPARATUS
Filed May 17, 1954 3 Sheets-Sheet 3
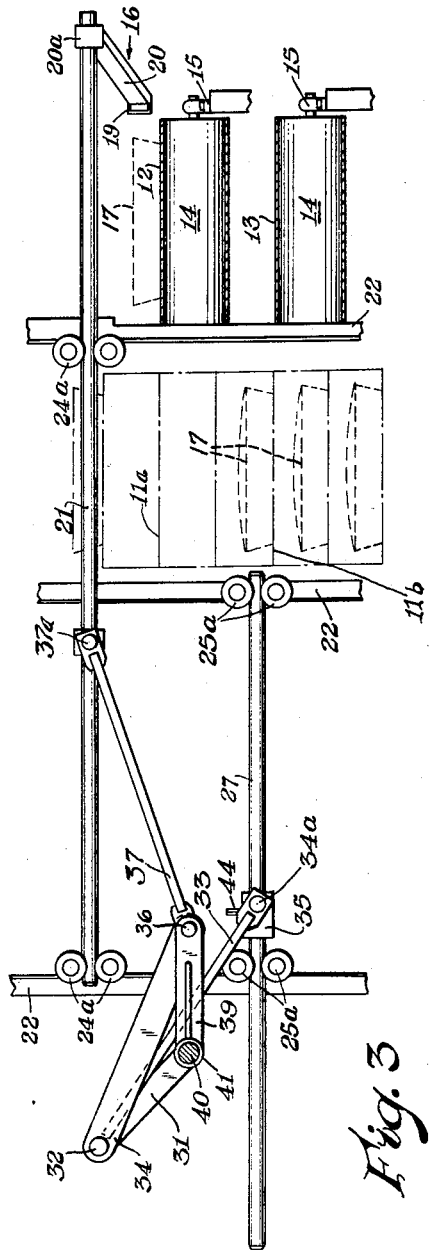
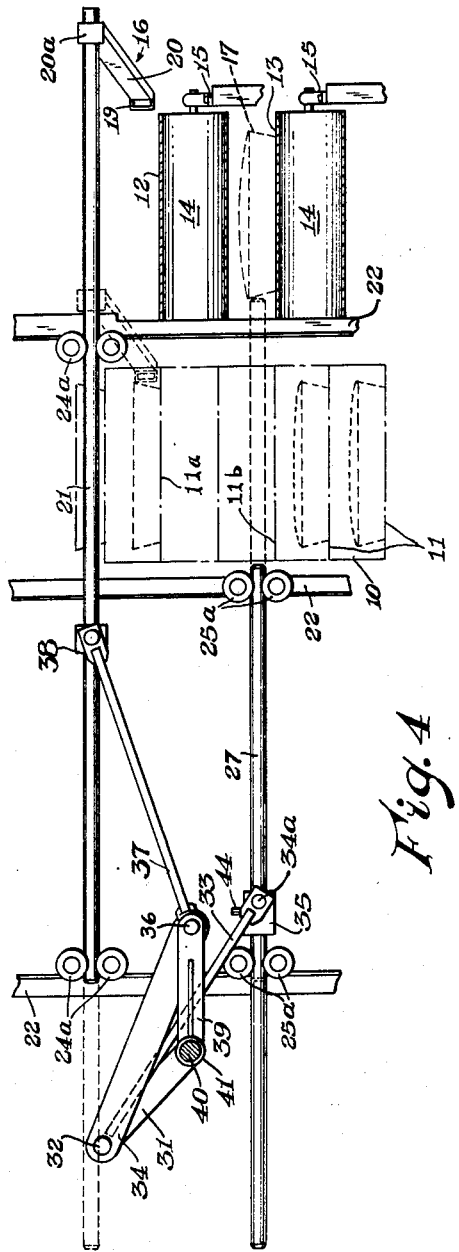
Fig. 3
Fig. 4
INVENTOR
Charles G. Gibbons
BY Fearman + Fearman,
ATTORNEYS.

United States Patent Office 2,931,483
Patented Apr. 5, 1960

2,931,483

RACK PROOFING APPARATUS

Charles G. Gibbons, Saginaw, Mich., assignor to Baker Perkins, Inc., Saginaw, Mich.

Application May 17, 1954, Serial No. 430,292

6 Claims. (Cl. 198—24)

This invention relates to continuous, automatic, rack-type proofing apparatus and more particularly to means in combination with apparatus of this type for loading pans of bread dough or the like onto the shelves of carrier racks from an in-feeding conveyor and unloading the same to an out-going conveyor after they have traveled a circuitous path through the controlled atmosphere of the proofer.

As is well known in the art, dough products which have been subjected to the controlled atmosphere of a proofer or the like must be particularly carefully handled since the impact of only slight jars or shocks will tend to damage or fracture the gas cells which will be formed in the dough proofing operation and cause its rise. The consequent release of gas from these cells will, of course, cause the collapse of the dough.

One of the prime objects of the instant invention is accordingly to design proofer loading and unloading means which is extremely smooth in operation and efficiently accomplishes its function without creating vibrations, shocks or impacts which would cause the collapse of the dough in the pans.

A further object of the invention is to design means of this type including pusher bars, each of which has a work stroke ideal for handling dough pans in that its initial movement from a rest position is relatively slow as the means is brought into engagement with the dough pans; the travel is then accelerated once the pans are in motion; and the travel of the means is finally slowed at the end of the stroke so that the deposit of the pans is accomplished in a very gentle manner. Such a stroke permits a much more rapid operation than a stroke which is necessarily slow in its entirety, and further, pans which are handled in the manner indicated will not be damaged during the loading and unloading operations and will provide long service.

Another object of the invention is to design proofer loading and unloading pusher bars which are simultaneously actuated by mechanical means so that no complicated timing or service problems arise.

A further object of my invention is to design a unitary proofer loading and unloading means which operates to deliver a group of dough pans or the like to a carrier rack and simultaneously removes the group of pans which has been longest in the proofer, the loading and unloading means being driven from a single motor which is energized after the carrier has been indexed to a position in which an empty shelf is adjacent the loading bar and a shelf supporting pans of bread which have been longest in the proofer is adjacent the unloading bar. With means of this nature, mechanism for synchronizing the movements of the respective loading and unloading elements will not be necessary.

A further object of the invention is to provide proofing apparatus with loading and unloading means which operate efficiently within a confined space, thus permitting the proofer housing to enclose the means and portions of the loading and unloading conveyors with the result that the dough pans can be processed through the proofer more rapidly without sacrificing actual proofing time. With apparatus of this nature, the proofing apparatus will have a wider range of operating speeds and in relation to conventional practice, will, where desired, permit the proofing time to be beneficially increased without a corresponding decrease in the capacity of the proofer.

Another object of the invention is to design proofing apparatus in which superposed loading and unloading conveyors lead into a proofer housing or enclosure and loading and unloading elements having relatively short strokes move at right angles to said conveyors to load and unload the shelves of indexible rack carriers.

A further object still is to provide proofing apparatus wherein it is practical for the proofer housing to enclose major portions of the incoming and outgoing conveyors so that the proofed dough may be retained in the proofing atmosphere until actually conveyed to the oven, thus confining the exposure of the proofed dough to the relatively dry and cool atmosphere of the bakery to a minimum.

Another object of the invention is to provide continuous rack type proofing apparatus with novel means for directly loading and unloading the shelves of the carrier racks, thus overcoming one of the major disadvantages inherent in systems wherein the racks are removed from the proofer for unloading. In the latter case, the proofed dough products on the shelves first unloaded and proceeding immediately to the oven are exposed to the relatively unsuitable atmosphere of the bakery for shorter periods than the products unloaded from successive shelves, whereas with the apparatus of the instant invention, the proofed dough loaves are exposed to the bakery atmosphere for the same length of time and accordingly the product is uniform.

A further object of the invention is to design loading and unloading means of practical and durable construction which are highly reliable and efficient in operation.

A still further object of the invention is to design proofing apparatus including loading and unloading means which can be very simply and economically manufactured and installed and very readily disassembled when necessary for repair or the like.

With the above and other objects in view, the present invention consists in the combination and arrangement of parts, hereinafter more fully described, illustrated in the accompanying drawings, and more particularly pointed out in the appended claims, it being understood that changes may be made in the form, size, proportion, and minor details of construction, without departing from the spirit, or sacrificing any of the advantages of the invention.

In the drawings:

Fig. 3 is a side elevational view thereof taken on the line 3—3 of Fig. 2 showing the loading and unloading elements in the rest position.

Fig. 4 is a view similar to Fig. 3 showing the loading and unloading elements at the completion of a working stroke.

Referring now more particularly to the accompanying drawings in which I have shown a preferred embodiment of my invention, a letter H generally designates a housing which encloses the various operating elements of the proofer apparatus, the atmosphere within the housing being carefully conditioned or controlled by a suitable air conditioning unit which is not shown inasmuch as it forms no part of the instant invention.

Figure 1:
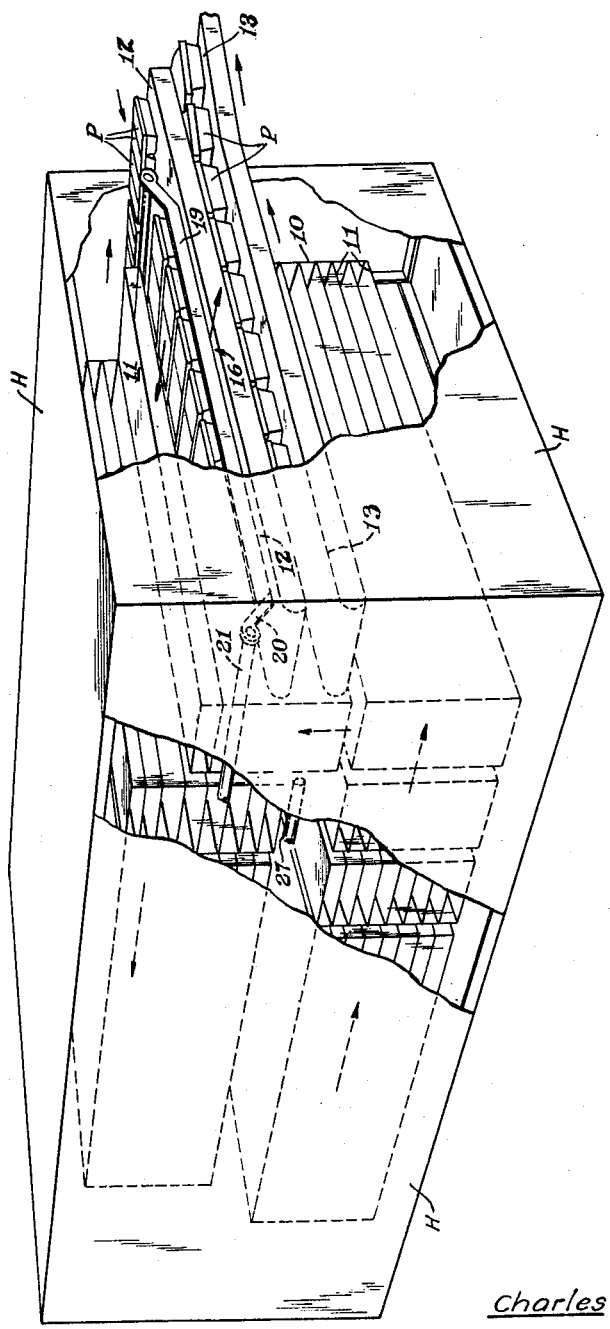
Fig. 1 is an isometric elevational, schematic view of a rack-type proofer, a portion of the proofer housing or enclosure being broken away to partly show the loading and unloading mechanism and the rack carriers. In the interest of clarity, the bread pans are omitted from the shelves of the rack carriers and are shown only on the incoming and outgoing conveyors.

Movably supported within the proofer enclosure H are carriers or racks 10 which include a plurality of shelves 11. The racks 10 which extend nearly the width of the housing H are moved in a continuous, circuitous path as indicated by suitable chain conveyors which are not shown in this application since they form no part of the instant invention. The chain conveyor could be continuous in nature such as is shown in Fig. 1 of the patent to Baker, No. 1,109,894, granted September 8, 1914, or could comprise an elevator chain at the front of the proofer, and upper horizontal conveyor chain, a lowerator chain at the rear of proofer and a lower horizontal chain conveyor in the manner disclosed in the patent to Baker, No. 1,837,605, granted December 12, 1931. In any event, the rack carrier 10 is indexed upwardly at the front of the device a shelf at a time and is thence moved longitudinally rearwardly in the upper portion of the housing H and descends at the rear of the enclosure to the lower portion of the housing H. From the lower rear of the enclosure, the carrier is moved longitudinally forwardly to the front of the enclosure where it is raised once again. Preferably, a separate elevator chain conveyor, upper horizontal chain conveyor, lowerator chain conveyor, and lower horizontal chain conveyor will be employed and a plurality of racks will closely follow one another along this circuitous path, the system being arranged such that the top shelf of a following carrier at the front of the device is spaced from the lower shelf of the carrier ahead a distance equal only to the spaced distance between the shelves of a given carrier. When a carrier has ascended at the front of the device to the top of the proofer or descended at the rear to the bottom of the proofer, the carrier is moved laterally by the upper chain conveyor or lower chain conveyor respectively so that there will be no interference with the ascent or descent of the following carrier. Similarly, when an ascending or descending carrier clears the longitudinally proceeding lower and upper carriers respectively, it moves onto the elevator and lowerator respectively.

It will be seen that the proofer housing H extends forwardly beyond the ascending racks at the front thereof and leading into this extended portion of the housing are transversely disposed conveyors 12 and 13 for delivering and removing pans of dough respectively. Rollers 14 drive the conveyors 12 and 13 which are supported in bearings 15 as usual. The conveyors are depicted as belt-type conveyors for convenience only and could clearly be of any other suitable construction. It will be seen that the belts of the conveyors are sufficiently spaced apart so that a pan in which the dough has risen can be carried on the conveyor 13 and this spaced distance, which must necessarily allow for the upper roller 14, is approximately equal to twice the spaced distance between the shelves of the rack carriers. Accordingly, since the loading and unloading means which will now be described operates simultaneously, only one shelf in the entire system of racks will ever be empty at a given time, and that shelf will be the one which is disposed between the conveyors 12 and 13 or the one between the shelves which are respectively being loaded and unloaded. The shelves which are being loaded and unloaded (see Figs. 3 and 4) are designated 11a and 11b respectively, and a loading pusher bar 16 moves rearwardly from a rest position in front of the conveyor 12 to push a group or nest of dough pans 17 from the conveyor 12 onto the shelf 11a while an unloading pusher bar 18 simultaneously moves forwardly from a rest position rearwardly of the shelf 11b to push a nest of dough pans 17 from the shelf 11b forwardly onto the unloading conveyor 13.

The bar 16 which straddles the carriers and proofer structure includes a pan-engaging member 19 connected by upwardly and outwardly inclined wing sections 20 to longitudinally disposed, reciprocable rods 21, the sections 20 having sockets 20a in which the outer ends of the rods 21 are fixed. The rods 21 are supported a sufficient distance above the surface of the conveyor 12 so that pans of dough on the conveyor 12 may pass thereunder with ease. Mounted on vertically disposed angle members 22 which form part of the structural framework of the proofer for supporting the carriers as they move longitudinally forwardly and rearwardly, are brackets 23 to which are fixed the shafts 24 of rotatable guides 24a, and it will be seen that the rods 21 are supported for reciprocating travel between the guides 24a. Similarly supported by rotatable guides 25a on shafts 25 which are mounted on other framework members 22 are rods 27 for moving the unloading pusher bar 18 forwardly. The pusher bar assemblies 16 and 18 are driven from a single motive source in a manner which will now be described, and obviously no problem of synchronizing the respective movements thereof will arise.

Mounted some distance rearwardly of the ascending rack carriers 10 is a shaft 28 which is journaled in bearings 29 on longitudinal frame members 30 which are shown only fragmentarily in the interests of clarity. The members 30 will be supported by vertical angle members such as shown at 22 which as previously noted, form part of the structural framework of the proofer.

Mounted on the ends of the shaft 28 which extend beyond the bearings 29 are cranks 31 including crankpins 32 on which are pivotally mounted inner connecting rods 33 and outer connecting rods 34. The inner connecting rods 33 are pivotally connected to pins 34a which project outwardly from bell binders 35 on the unloader rods or shafts 27. The connecting rods 34 are pivotally connected by pins 36 to connecting rods 37 which in turn are pivotally connected to pins 37a projecting outwardly from bell binders 38 on the loader rods or shafts 21.

Cranks 39 connect the rods 37 with shafts 40 which are journaled in bearings 41 in alignment with the connecting shaft 28, and the longitudinal members 42 which carry the bearings 41 are supported between vertical members 43. Clearly, either of the shafts 40 or the connecting shaft 28 could be driven as desired, but in the instant embodiment I have shown the left hand shaft 40 as extended and this shaft will extend through the housing H to a motor (not shown) which is supported on a platform (not shown) on the outer wall of the housing. One of the shafts 40 will preferably be driven by the motor so that the motor can be mounted outside the proofer to avoid the corrosive effects of the atmosphere thereof.

Figure 2:
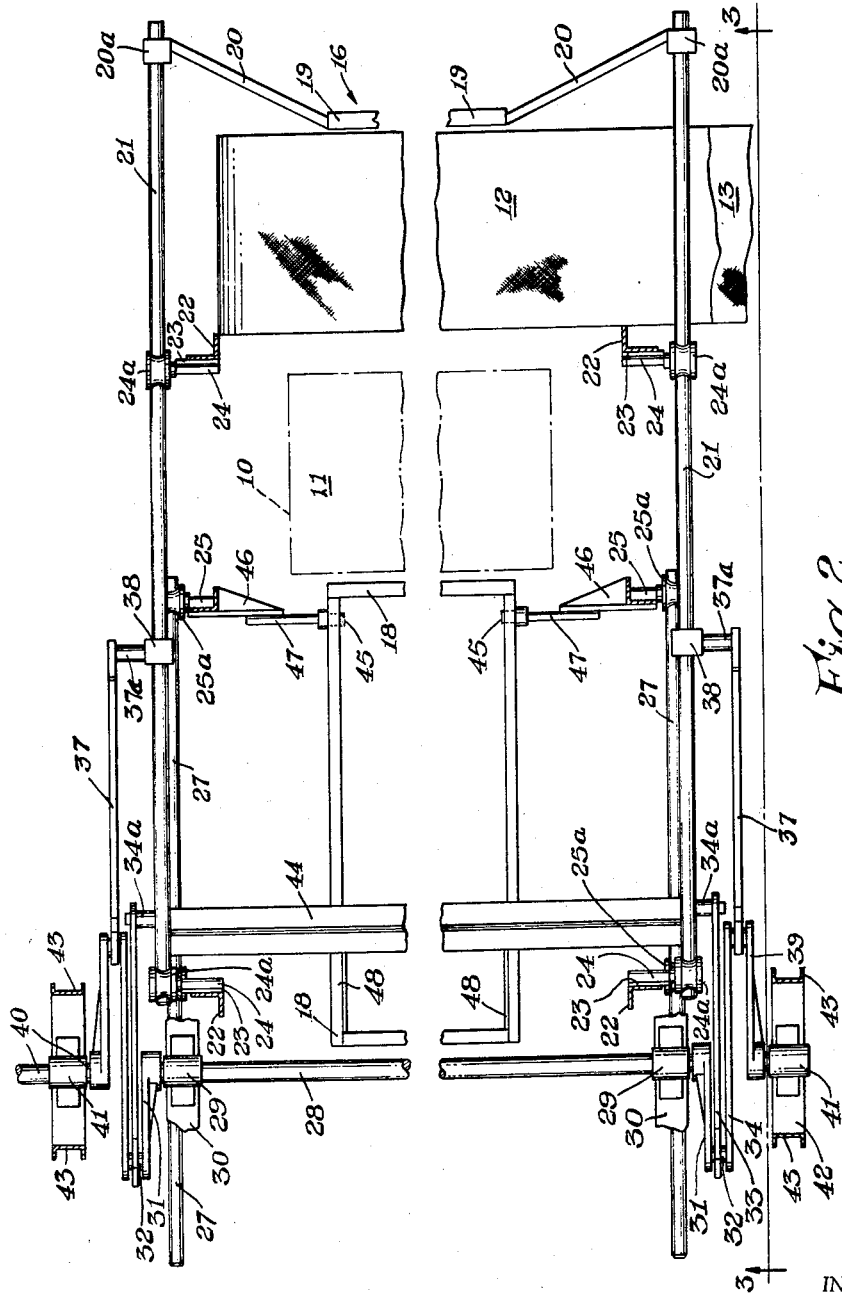
Fig. 2 is a top plan view of the loading and unloading mechanism.

When viewed as in Figs. 2 and 3, the shafts 40 and connecting shaft 28 must necessarily be driven in a counter-clockwise direction so that the unloader shafts or rods 27 will move forwardly from the rest position in which they are shown while the loader shafts or rods 21 are simultaneously moved rearwardly from the position in which they are shown.

The unloading pusher member 18 which comprises a rectangular frame (see Fig. 2) is connected to the bell binders 35 by a hanger bar or cross tie 44 which is secured to the upper faces of the binders 35. In order that the pusher frame or bar 18 may take a full stroke, the bar 44 is rigidly connected thereto near the rear end thereof. The front end of the bar is slidably supported on rollers 45 as shown, the brackets 46 to which the stationary shafts 47 of the rollers are fixed being mounted on the members 22 which support the front guides 25a. Counterweights 48 provided at the rear end of the pusher bar frame 18 tend to balance the same.

The operation of the mechanism described is clearly illustrated in Figs. 3 and 4 wherein the loading and unloading elements are shown in rest position and at the completion of a working stroke respectively. Assuming the carrier 10 to have been indexed upwardly to the position in which it is shown in Fig. 3 and the motor (not shown) driving the shaft 40 to have been energized, the connecting rods 34 and 37 will actuate the rods 27 and 21 and thereby the unloading pusher bar 18 and portion 19 of the loading pusher bar 16 slowly forwardly and rearwardly respectively into engagement with the pans 17 on the shelf 11b and conveyor 12 respectively. During the next portion of the working stroke, the pusher bars 18 and 16 move more rapidly to push the pans from the shelf 11b and conveyor 12 onto the conveyor 13 and shelf 11a respectively. At the end of the working stroke, the movement of the pusher bars 18 and 16 will have slowed to the original pace so that the pans are very gently deposited. Clearly, the bars 18 and 16 will be returned from the position in which they are shown in Fig. 4 to rest position in the same manner, but will not, of course, move any pans in the process. When this cycle has been completed, the carrier 10 is indexed upwardly one shelf so that the shelves immediately under the shelves 11a and 11b respectively will be available for loading and unloading. The indexed movement of the racks 10 along their circuitous path must, of course, be in timed relation with the energization of the motor for driving the shaft 40 and this is preferably accomplished by a suitable electrical control system which is disclosed in co-pending application Serial No. 472,074, filed October 25, 1954, but forms no part of the instant invention. Obviously, no means need be provided to synchronize the movements of the pusher bars 16 and 18. Since the conveyors 12 and 13 travel transversely and the loading and unloading elements longitudinally at substantially right angles thereto in the manner described, the proofer housing H can be extended to enclose a considerable portion of the conveyors and the capacity of the proofer accordingly is greatly increased in a very economical manner.

It should be apparent from the foregoing that I have perfected a very practical loading and unloading means for use with proofing apparatus of the type described which has loading and unloading strokes particularly adapted to handle dough pans gently and with extreme care.

It is to be understood that the above descriptive matter is at all times to be interpreted as illustrative rather than limiting and that various equivalent changes may be made in the various elements which are defined by the claims and in their location and arrangement without departing from the spirit of the invention or the scope of the appended claims.

What I claim is:

1. In proofer apparatus of the kind including a carrier having shelves: support surfaces disposed in front of said carrier adjacent different shelves of said carrier, one of said support surfaces constituting a loading station adapted to support articles thereon, and another support surface constituting an unloading station, a loading pusher bar straddling said carrier, said bar including rearwardly extending spaced-apart rods and a front article engaging section disposed forwardly of said carrier near the portion of the surface comprising the loading station remote from said carrier, means supporting said rods of the pusher bar for reciprocatory travel, an unloading pusher bar interjacent the rods of said pusher bar and including an article engaging section disposed rearwardly of said carrier, said unloading bar having rods supported outwardly of said carrier substantially in parallelism with the rods of said loading bar, means supporting said rods of the unloading bar for reciprocatory travel, and mechanical means connected to the rods of the loading bar operable to impart movement thereto, said mechanical means also being connected to the rods of said unloading bars and being operable to impart simultaneously movement of the rods of said unloading bar, the movement of said bars being of such scope as to cause said loading bar to sweep wholly across the support surface constituting said loading station and to cause the unloading bar to sweep wholly across the shelf of said carrier at said unloading station.

2. The construction set forth in claim 1 in which said means for supporting the rods of the pusher bars for reciprocatory travel comprises vertically spaced rollers with the peripheral surfaces thereof shaped to accommodate said shafts.

3. In proofer apparatus of the kind including a vertically movable carrier having vertically spaced shelves accessible from the front and rear thereof: superposed support surfaces disposed in front of said carrier with the upper surface constituting a loading station and the lower surface an unloading station, a substantially U-shaped loading bar disposed above said loading station and straddling said carrier, said bar including rearwardly extending rods and an article engaging cross member connecting the same, with the cross member disposed a spaced distance in front of the carrier in position to push articles on said loading station rearwardly when the loading bar is moved rearwardly, an unloading pusher bar frame between and below said rods and including a front member of less length than the carrier shelves disposed immediately rearwardly of the carrier opposite said unloading station, longitudinally disposed rods for said unloading pusher bar disposed outwardly of said carrier, a cross tie connecting said unloader frame near the rear end thereof with said unloading bar rods, bearing means supporting said loader and unloader bar rods for reciprocatory travel, roller means supporting the front end of said unloader bar for reciprocatory travel, a transversely disposed rotatable drive shaft adjacent the rear ends of said loader and unloader bar rods, and crank and connecting rod mechanism interconnecting said drive shaft and the rear ends of said rods operable to translate rotation of said drive shaft to the rods of said loader and unloader bars to move the same simultaneously in opposite directions slowly into engagement with articles on the loading station and a carrier shelf respectively, thence more rapidly to move the articles through a greater portion of their travel, and finally less rapidly to gently deposit the articles on another carrier shelf and the unloading station respectively.

4. The construction set forth in claim 3 in which said unloading pusher bar frame is counterweighted near the rear end thereof.

5. In proofing apparatus of the kind including a vertically movable carrier having transversely extending, vertically spaced shelves for supporting pans of dough accessible at the front and rear thereof, and a longitudinally disposed proofer housing enclosing said carrier and extending forwardly beyond the path of travel thereof: a pair of vertically spaced-apart conveyors extending transversely into the front end of said housing from one side thereof, the conveyors being disposed adjacent the front of said carrier with the upper conveyor traveling transversely into said housing and the lower conveyor traveling transversely out of said housing, the shelves of the carrier being spaced such that in a given position one shelf is adjacent the upper conveyor and another shelf is adjacent the lower conveyor, a substantially U-shaped loading pusher bar having a pair of spaced apart rods and a pan-engaging section adjacent the front edge of said upper conveyor when in rest position and upwardly and forwardly inclined wing sections connecting the pan engaging section and rods, an unloading pusher bar between the rods of said pusher bar and below the same, said unloader bar including an article engaging section disposed rearwardly of said carrier substantially opposite said lower conveyor, means supporting the unloading bar for reciprocatory travel, a drive shaft adjacent the rear ends of said loader bar rods, means mounting said drive shaft for rotation, and mechanism connecting said drive shaft with the loader bar rods and the unloading bar operable in response to rotation of said drive shaft to sweep the loader bar rearwardly wholly across the upper conveyor and transfer pans from the upper conveyor to a shelf of said conveyor and operable to sweep the unloading bar simultaneously forwardly wholly across said another shelf to move articles from the latter shelf of said carrier to the lower conveyor.

6. In proofing apparatus of the kind including a vertically movable carrier having transversely extending, vertically spaced shelves accessible at the front and rear thereof, and a longitudinally disposed proofer housing enclosing said carrier and extending forwardly beyond the path of travel thereof: a pair of vertically spaced-apart conveyors extending transversely into the front end of said housing from one side thereof, the conveyors being disposed adjacent the front of said carrier with the upper conveyor extending transversely into said housing and the lower conveyor extending transversely out of said housing, the shelves of the carrier being spaced such that in a given position of said carrier one shelf is adjacent the upper conveyor and another shelf is adjacent the lower conveyor, a substantially U-shaped loading bar disposed above said loading station and straddling said carrier, said bar including rearwardly extending rods and an article engaging cross member connecting the same, the cross member being disposed a spaced distance in front of the carrier in position to push articles on said upper conveyor rearwardly when the loading bar is moved rearwardly, an unloading pusher bar between and below said rods and including a front member of less length than the carrier shelves, said unloading bar being disposed immediately rearwardly of the carrier opposite said loading station, longitudinally disposed rods for said unloading pusher bar and connected thereto disposed outwardly of said carrier, bearing means supporting said loader and unloader bar rods for reciprocatory travel, a transversely disposed, rotatable drive shaft adjacent the rear ends of said loader and unloader bar rods, means mounting said drive shaft for rotation, and crank and connecting rod mechanism interconnecting said drive shaft and said loading and unloading bar rods operable in response to rotation of said drive shaft to translate the rotation of the latter to the rods of said loader and unloader bars to move the same simultaneously in opposite directions relatively slowly into engagement with articles on the upper conveyor and a carrier shelf respectively, thence more rapidly to move the articles through a greater portion of their travel, and finally less rapidly to gently deposit the articles on another carrier shelf and the lower conveyor respectively.

References Cited in the file of this patent

UNITED STATES PATENTS

| | | |
|---|---|---|
| 1,036,490 | Hanna | Aug. 20, 1912 |
| 1,038,784 | Olson | Sept. 17, 1912 |
| 1,109,894 | Baker | Sept. 8, 1914 |
| 1,832,343 | Wittman | Nov. 17, 1931 |
| 1,837,605 | Baker | Dec. 22, 1931 |
| 2,124,423 | Ladewig | July 19, 1938 |
| 2,445,884 | MacManus | July 27, 1948 |
| 2,599,605 | Bower | June 10, 1952 |
| 2,686,587 | Johnson et al. | Aug. 17, 1954 |